United States Patent
Lee et al.

(10) Patent No.: US 10,572,033 B2
(45) Date of Patent: Feb. 25, 2020

(54) MOUSE DEVICE AND INTERACTIVE SYSTEM HAVING ANGLE SNAP

(71) Applicant: PIXART IMAGING INC., Hsin-Chu County (TW)

(72) Inventors: Joon-Chok Lee, Penang (MY); Kevin Len-Li Lim, Penang (MY)

(73) Assignee: PIXART IMAGING INC., Hsin-Chu County (TC)

( * ) Notice: Subject to any disclaimer, the term of this patent is extended or adjusted under 35 U.S.C. 154(b) by 38 days.

(21) Appl. No.: 15/927,254

(22) Filed: Mar. 21, 2018

(65) Prior Publication Data
US 2019/0294265 A1  Sep. 26, 2019

(51) Int. Cl.
*G06F 3/0354* (2013.01)
*G06F 3/044* (2006.01)
*G06F 3/0362* (2013.01)

(52) U.S. Cl.
CPC ........ *G06F 3/03543* (2013.01); *G06F 3/0362* (2013.01); *G06F 3/044* (2013.01)

(58) Field of Classification Search
CPC ...................................................... G06F 3/033
See application file for complete search history.

(56) References Cited

U.S. PATENT DOCUMENTS

| | | | |
|---|---|---|---|
| 5,793,377 A * | 8/1998 | Moore | G06F 3/04845 345/419 |
| 2003/0048284 A1 * | 3/2003 | Chang | G06F 3/04842 345/662 |
| 2003/0201982 A1 * | 10/2003 | Iesaka | G06F 1/1616 345/168 |

* cited by examiner

Primary Examiner — Robin J Mishler
(74) Attorney, Agent, or Firm — Hauptman Ham, LLP

(57) ABSTRACT

There is provided a mouse device including a mouse case, a detection switch and a control chip. The mouse case is held by a user and operated on a work surface. The detection switch is arranged on the mouse case and configured to output a detected signal according to user operation. The control chip is electrically coupled to the detection switch and configured to enable or disable an angle snapping function according to the detected signal.

18 Claims, 5 Drawing Sheets

| velocity (ips) | acceleration (G) | angle snap |
|---|---|---|
| V < 1 | A < 2 | no snap |
| 5>V≥1 | 5>A≥2 | snap at 2 degrees |
| 10>V≥5 | 10>A≥5 | snap at 5 degrees |
| V≥10 | A≥10 | snap at 10 degrees |

| velocity (ips) | acceleration (G) | angle snap |
| --- | --- | --- |
| V < 1 | A < 2 | no snap |
| 5>V≥1 | 5>A≥2 | snap at 2 degrees |
| 10>V≥5 | 10>A≥5 | snap at 5 degrees |
| V≥10 | A≥10 | snap at 10 degrees |

FIG. 6

MOUSE DEVICE AND INTERACTIVE SYSTEM HAVING ANGLE SNAP

BACKGROUND

1. Field of the Disclosure

This disclosure generally relates to a human-machine interaction and, more particularly, to a mouse device and an interactive system having an angle snap.

2. Description of the Related Art

A function of the mouse device is to control the cursor position shown on a display screen. In addition, in some game applications the mouse device is further used to control an aiming location of the player, e.g., controlling an aiming location in a first person shooting game.

The user is required to move a mouse device in a straight line in operating some software applications, e.g., drafting software or the above mentioned shooting game, so as to control the cursor or aiming location to move along a specific straight line.

However, it is not only difficult to control the mouse device to exactly move in a specific straight line but also the user can get tired easily to operate in such a way.

Accordingly, it is necessary and practicable to provide a mouse device that can perform the angle snap according to the selection of a user.

SUMMARY

The present disclosure provides a mouse device and an interactive system having an angle snapping function, wherein a specific button, switch or sensing component is arranged on a mouse case of the mouse device or other peripheral devices of the interactive system to allow the user to quickly enter or leave an angle snap mode.

The present disclosure further provides a mouse device and an interactive system having an angle snapping function, wherein a specific button, switch or sensing component is arranged on a mouse case of the mouse device or other peripheral devices of the interactive system to allow the user to quickly select or change a snap angle under an angle snap mode.

The present disclosure further provides a mouse device and an interactive system having an angle snapping function, wherein a snap angle is automatically changed under an angle snap mode according to the current velocity and/or current acceleration.

The present disclosure provides a mouse device including a mouse case, a detection switch and a control chip. The detection switch is arranged on the mouse case, and configured to output a detected signal while being operated. The control chip is arranged inside the mouse case. The control chip is configured to calculate and output displacement of the mouse device, and enter an angle snap mode according to the detected signal to perform an angle snap on the outputted displacement.

The present disclosure further provides a mouse device including a mouse case, a detection switch and a control chip. The detection switch is arranged on the mouse case, and configured to output a detected signal while being operated. The control chip is arranged inside the mouse case. The control chip is configured to calculate at least one of a velocity and an acceleration, enter an angle snap mode according to the detected signal, and adjust a snap angle, under the angle snap mode, according to at least one of the velocity and the acceleration.

The present disclosure further provides an interactive system including a mouse device, a display screen, a host system and a detection switch. The mouse device is configured to detect mouse displacement with respect to a work surface. The display screen is configured to show a cursor thereon. The host system is coupled to the mouse device and the display screen, and configured to control a cursor displacement of the cursor shown on the display screen according to the mouse displacement. The detection switch is arranged on the mouse device or the host system, and configured to output a detected signal while being operated. The host system is configured to enter an angle snap mode when receiving the detected signal so as to perform an angle snap on the cursor displacement.

The mouse device and interactive system of the present disclosure are adapted to application software, such as drafting software and game software, which is required to switch into/out from an angle snap mode quickly to achieve the effectiveness of locus smoothing and jitter elimination.

In the human-machine interactive system of the present disclosure, a user may select to enable or disable an angle snapping function without entering a setting window or clicking on a specific icon on a display screen at first. The user only needs to perform a simple press or touch on a peripheral device to enter or leave an angle snap mode, e.g., pressing once to enter and pressing again to leave, or continuously pressing to enter and releasing to leave. Furthermore, different snap angles are selectable by pressing a same button for different number of times, by pressing different buttons or by rotating a knob.

In the human-machine interactive system of the present disclosure, whether to perform an angle snap under an angle snap mode is identified automatically. For example, when the current velocity or acceleration of a mouse device with respect to a work surface is higher than a predetermined velocity threshold or acceleration threshold, the angle snap is executed. On the contrary, when the current velocity or acceleration of the mouse device with respect to the work surface is lower than the predetermined velocity threshold or acceleration threshold, the angle snap is released.

The human-machine interactive system of the present disclosure further changes a snap angle automatically under an angle snap mode. For example, the interactive system has a memory that previously recorded a plurality of velocity thresholds or acceleration thresholds, wherein each of said thresholds corresponds to one snap angle. For example, the threshold having a higher value corresponds to a larger snap angle. In addition, a host system coupled to the mouse device stores a look-up table which includes a relationship between multiple thresholds and snap angles to allow the user to set the required snap angle using a user interface (e.g., via a pop-up window), wherein the enablement and disablement of the angle snapping function is not performed via said user interface or a graphic interface.

BRIEF DESCRIPTION OF THE DRAWINGS

Other objects, advantages, and novel features of the present disclosure will become more apparent from the following detailed description when taken in conjunction with the accompanying drawings.

FIG. 6 is the operating parameter under an angle snap mode according to one embodiment of the present disclosure.

DETAILED DESCRIPTION OF THE EMBODIMENT

It should be noted that, wherever possible, the same reference numbers will be used throughout the drawings to refer to the same or like parts.

The present disclosure is adapted to the locus smoothing of a mouse device to allow a user to snap an angle of a locus quickly when it is necessary so as to improve the practicality of the mouse device. The angle snap mode of the present disclosure is not entered through a graphic interface shown on a display screen in order to realize the real-time switching.

Figure 1:
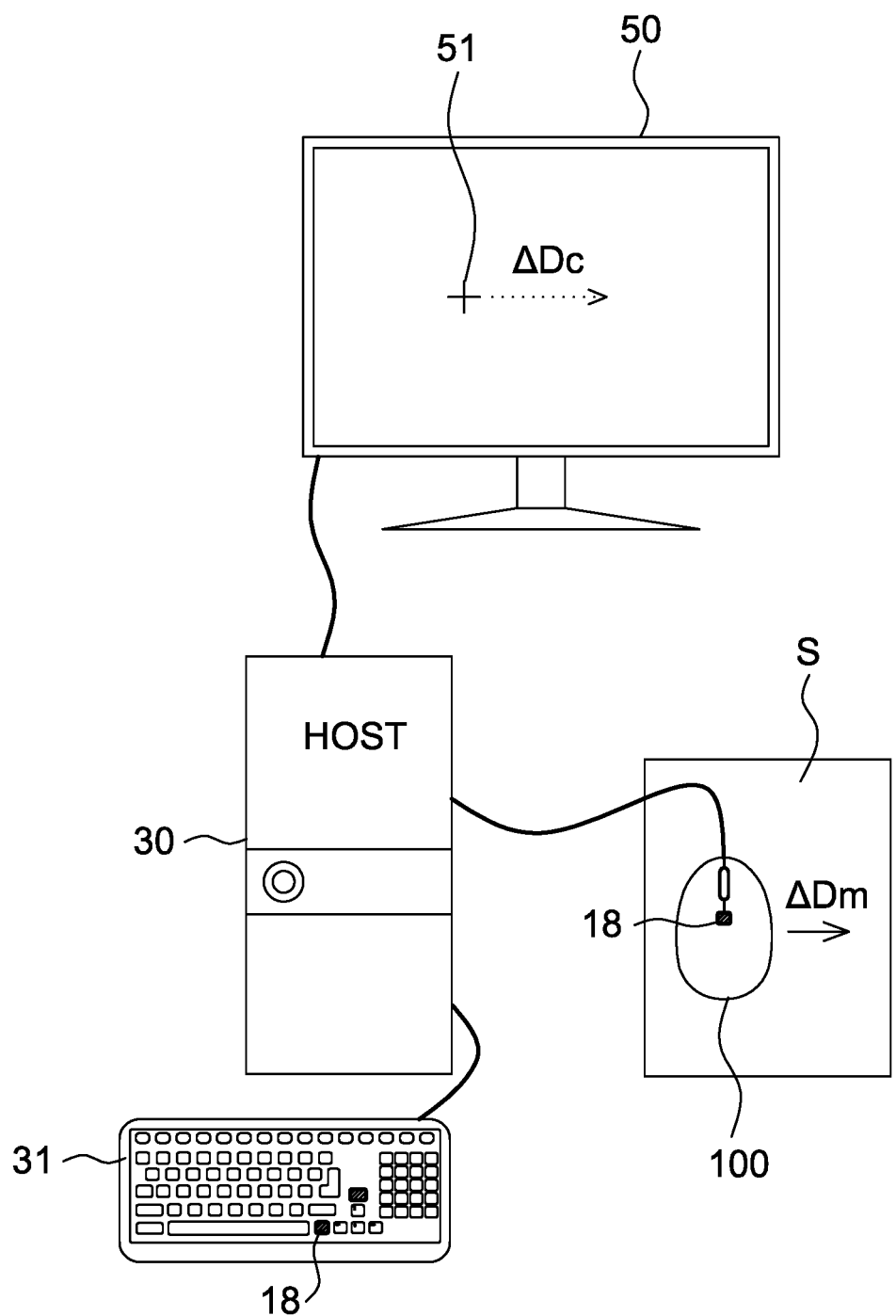
FIG. 1 is a schematic diagram of a human-machine interactive system according to one embodiment of the present disclosure.

Referring to FIG. 1, it is schematic diagram of a human-machine interactive system according to one embodiment of the present disclosure. The human-machine interactive system includes a mouse device 100, a host system 30 and a display screen 50, wherein the host system 30 is wired or wirelessly coupled to the mouse device 100 and the display screen 50.

The display screen 50 is a display device known to the art, such as a liquid crystal display, a plasma display or a projection screen, but not limited thereto. A picture shown on the display screen 50 includes a cursor 51 which is shown on the display screen 50 by a desired pattern (e.g., FIG. 1 showing a cross pattern, but not limited thereto). The host system 30 is used to control cursor displacement ΔDc of the cursor 51 shown on the display screen 50 according to the mouse displacement ΔDm obtained by the mouse device 100. A ratio R between the mouse displacement ΔDm and the cursor displacement ΔDc (e.g. ΔDc=R*ΔDm) is determined according to, for example, sensitivity of the mouse device 100 and/or the resolution and size of the display screen 50. The human-machine system of the present disclosure further automatically adjusts the ratio R corresponding to different types of the display screen 50.

Figure 2:
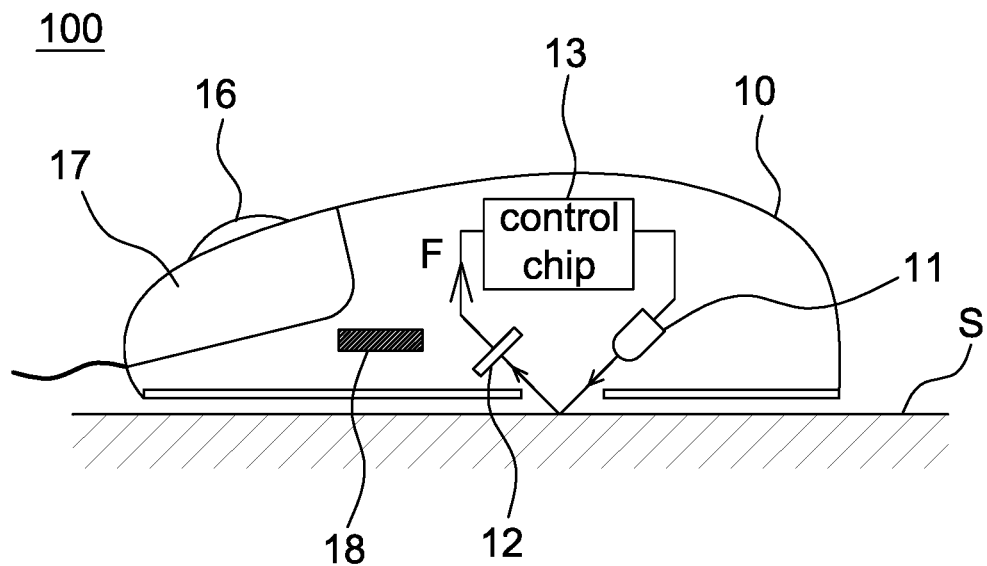
FIG. 2 is a schematic diagram of a mouse device according to one embodiment of the present disclosure.

Referring to FIG. 2 at the same time, it is a schematic diagram of a mouse device 100 according to one embodiment of the present disclosure. The mouse device 100 is operated by a user and used to detect mouse displacement ΔDm with respect to a work surface S. The mouse device 10 has a mouse case 10, and a light source 11, an image sensor 12 and a control chip 13 arranged inside the mouse case 10. The mouse case 10 is held by a user. The control chip 13 is used to calculate and output the mouse displacement ΔDm of the mouse device 100. It is appreciated that if the mouse device 100 is not an optical mouse, the light source 11 and the image sensor 12 are not implemented.

The light source 11 is disposed inside the mouse case 10, electrically coupled to the control chip 13 to be controlled thereby and used to illuminate the work surface S. The light source 11 is, for example, a light emitting diode or a laser diode, and used to emit light of an identifiable wavelength, e.g., red light and/or infrared light.

The image sensor 12 is disposed inside the mouse case 10, electrically coupled to the control chip 13 and used to acquire reflected light from the work surface S to generate, at a frame rate, image frames F to be sent to the control chip 13. The image sensor 12 includes, for example, a CMOS image sensor, a CCD image sensor or other optical detecting device for converting light energy to electrical signals, e.g., generating pixel raw data.

The control chip 13 includes, for example, a digital signal processor (DSP), a microcontroller unit (MCU) or an application specific integrated circuit (ASIC) that calculates the mouse displacement ΔDm by comparing (e.g., using software code and/or hardware code) image frames F successively captured at different times, e.g., calculating correlation between image frames F. In addition, the control chip 13 further calculates at least one of a velocity and an acceleration of the mouse device 100 with respect to the work surface S according to multiple mouse displacements ΔDm obtained within different time intervals.

It should be mentioned that although the light source 11 and the image sensor 12 are located outside of the control chip 13 in FIG. 2, the present disclosure is not limited thereto. In other embodiments, at least one of the light source 11 and the image sensor 12 is included in the control chip 13 to form a control chip 13 integrated with a light source and/or an image sensor.

Figure 3:
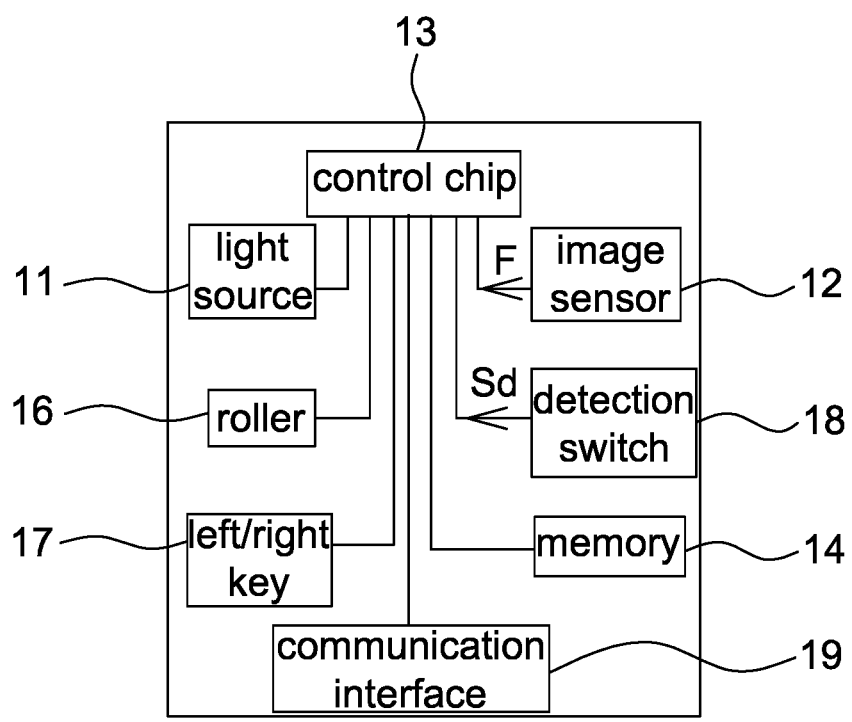
FIG. 3 is a block diagram of a mouse device according to one embodiment of the present disclosure.

Referring to FIG. 3 at the same time, it is a block diagram of a mouse device 100 of the present disclosure in which some components of the mouse device 100 are connected to the control chip 13 via conductive lines or via a bus line. In order to allow the user to select to enter an angle snap mode, the human-machine interactive system of the present disclosure further includes a detection switch 18, which is arranged on the mouse device 100 or the host system 30 (as shown in FIG. 1). The detection switch 18 is used to output a detected signal Sd to the control chip 13 while being operated. The detection device 18 is arranged on a surface of the mouse case 10, e.g., at an upper surface, a left surface or a right surface without particular limitations. For example, FIG. 2 shows that the detection switch 18 is disposed at a left surface of the mouse case 10; whereas, FIG. 1 shows that the detection switch 18 is disposed at an upper surface of the mouse device 10. In other embodiments, the host system 30 further includes a keyboard 31, and the detection switch 18 is arranged on the keyboard 31 as shown in FIG. 1, in this case not on the mouse device 100. The control chip 13 or the host system 30 enters an angle snap mode according to the detected signal Sd.

It should be mentioned that although in present disclosure the keyboard 31 is included in the host system 30, but the present disclosure is not limited thereto. In other embodiments, the keyboard 31 is a peripheral device independent and separated from the host system 30.

In the present disclosure, the way how the detection switch 18 is operated is determined according to different types of the detection switch 18. For example, the detection switch 18 is selected from a mechanical button, a position switch, a mouse roller, a capacitive touch device and a proximity sensor.

For example, when the detection switch 18 is a mechanical button, said being operated is referred to being pressed by a user. In addition, the detection switch 18 herein is an additionally arranged button different from the left and right keys 17 of the mouse device 100.

For example, when the detection switch 18 is a position switch, said being operated is referred to that a conducting position thereof is changed by a user. For example, if the position switch has two conducting positions, a first position indicates an angle snap mode and a second position indicates a normal mode.

In one aspect, the detection switch 18 is integrated with a mouse roller 16. That is, in addition to be rolled, the mouse roller 16 is pressable by a user to change a longitudinal position like a push button. Accordingly, said being operated is referred to being pressed by a user.

For example, when the detection switch 18 is a capacitive touch device, said being operated is referred to detecting a touch event. In a non-limiting embodiment, a sensing area of the capacitive touch device is smaller than a surface region of a single finger. The way that the capacitive touch device senses a touch event is known to the art, e.g., sensing a capacitance variation, and thus details thereof are not described herein.

For example, when the detection switch 18 is a proximity sensor, said being operated is referred to sensing an approaching object. The proximity sensor is a conventional proximity sensor, e.g., an optical, ultrasonic or infrared proximity sensor without particular limitations. The way that a proximity sensor senses an approaching object is known to the art, and thus details thereof are not described herein.

Under an angle snap mode, the control chip 13 or the host system 30 (e.g., a processing unit therein) is used to perform an angle snapping function according to the detected displacement (e.g., mouse displacement $\Delta Dm$) obtained by the mouse device 100 so as to perform an angle snap on the cursor displacement $\Delta Dc$ of the cursor 51. As to which of the control chip 13 or the host system 30 that executes the snapping operation is determined by, for example, a disposed position of the detection switch 18. The methods that the control chip 13 and the host system 30 perform the angle snap are similar (e.g., implemented by software and/or firmware) only being performed by different components.

For example, when the detection switch 18 is arranged on the mouse device 100, under the angle snap mode the control chip 13 directly performs an angle snap on the mouse displacement $\Delta Dm$ to be outputted (e.g. via a communication interface 19). The display screen 50 shows the cursor motion according to the angle-snapped mouse displacement $\Delta Dm$.

For example, when the detection switch 18 is arranged on the keyboard 31, the host system 30 receives the mouse displacement $\Delta Dm$ (not angle-snapped yet) from the mouse device 100 (e.g., outputted via the communication interface 19), and then performs an angle snap on the cursor displacement $\Delta Dc$ of the cursor 51 shown on the display screen 50. In another embodiment, when the detection switch 18 in the host system 30 is operated, the host system 30 outputs an enablement signal to the mouse device 100 (e.g., via a communication interface thereof) to cause the mouse device 100 to perform an angle snap on the mouse displacement $\Delta Dm$ at first before the mouse displacement $\Delta Dm$ is sent to the host system 30. The host system 30 then controls the display screen 50 to show the cursor movement according to the angle-snapped mouse displacement $\Delta Dm$.

No matter which of the control chip 13 or the host system 30 performs the angle snap, similar angle-snapping effects on the movement of the cursor 51 are shown on the display screen 50.

For illustration purposes, the detection switch 18 is described herein as being located on the mouse device 100. A person of ordinary skill in the art would understand, after reading the operation described below, the operation when the detection switch 18 is located in the host system 30.

Figure 4:
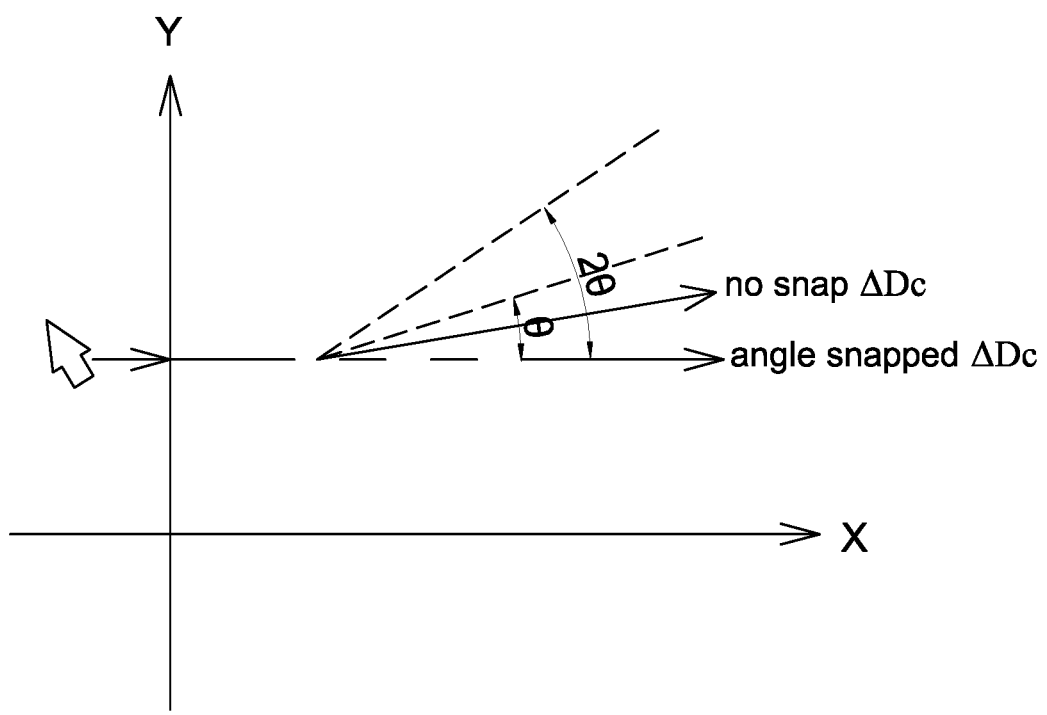
FIG. 4 is an operational schematic diagram of the angle snap under an angle snap mode according to one embodiment of the present disclosure.

Referring to FIG. 4, it is a schematic diagram of the angle snap in the embodiment of the present disclosure. Herein, said angle snap is referred to that when an angle variation of the detected displacement (e.g., the mouse displacement $\Delta Dm$ or the cursor displacement $\Delta Dc$) does not exceed a snap angle $\theta$, a straight cursor movement $\Delta Dc$ is outputted (e.g., FIG. 4 showing along the X direction, but not limited thereto), i.e., not turning a moving direction. When an angle variation of the detected displacement varies more than or equal to a snap angle $\theta$ but smaller than a twice of the snap angle 20, a moving direction of the cursor displacement $\Delta Dc$ is turned to a direction by the snap angle $\theta$. When an angle variation of the detected displacement varies more than or equal to a twice of the snap angle 20 but smaller than a triple of the snap angle 30, a moving direction of the cursor displacement $\Delta Dc$ is turned to a direction by the twice of the snap angle 20, and so on.

Figure 5A:
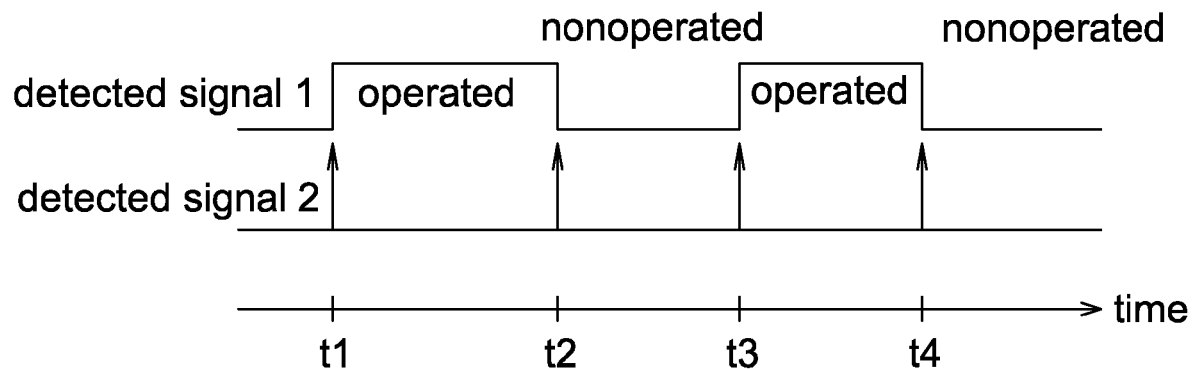
FIG. 5A is a schematic diagram of detected signals of a detection switch according to one embodiment of the present disclosure.
Figure 5B:
FIGS. 5B-5C are operational schematic diagrams of the angle snap mode corresponding to the detected signals in FIG. 5A.
Figure 5C:
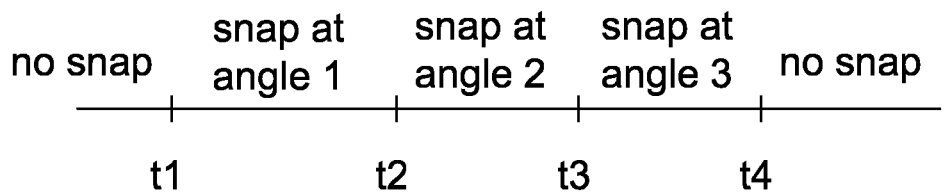

Referring to FIGS. 5A-5C, they are operational schematic diagrams of the angle snap mode according to some embodiments of the present disclosure. It is assumed herein that there is no operation being detected by the detection switch 18 within a predetermined time interval before the time point t1.

In a non-limiting embodiment, when the control chip 13 receives the detected signal Sd for a first time (e.g., indicated by an arrow of the detected signal 2 at a time point t1 in FIG. 5A), an angle snap mode is entered. When the control chip 13 receives the detected signal Sd for a second time (e.g., indicated by an arrow of the detected signal 2 at a time point t2 in FIG. 5A), the angle snap mode is left, as shown in FIG. 5B. Similarly, within a time interval between time points t3 and t4 of FIG. 5B, an angle snap mode is entered, and the angle snap mode is left again at time point t4. Time intervals between t1-t2, t2-t3 and t3-t4 are determined by the operation of a user.

In another non-limiting embodiment, the detection switch 18 outputs an enabling signal (i.e. the detected signal Sd) to the control chip 13 when detecting a start of operation, and outputs a releasing signal (i.e. the detected signal Sd) to the control chip 13 when detecting an end of operation. Accordingly, when the control chip 13 receives the enabling signal (e.g., a rising edge of the detected signal 1 at a time point t1 of FIG. 5A), an angle snap mode is entered; whereas, when the control chip 13 receives the releasing signal (e.g., a falling edge of the detected signal 1 at a time point t2 of FIG. 5A), the angle snap mode is left, wherein said leaving the angle snap mode is referred to that a normal mode is returned, and no angle snap will be performed in the normal mode. In other words, in this embodiment the time intervals t1-t2 and t3-t4 of the detected signal 1 indicate an operation is being detected continuously, e.g., continuously being pressed, touched or approached by an object; whereas, within a time interval t2-t3 and after a time point t4 of the detected signal 1 indicate no operation is being detected by the detection switch 18.

In the above embodiments, the detection switch 18 is used to enable or disable an angle snapping function. In other embodiments, the control chip 13 further changes, under the angle snap mode, a snap angle according to a number of operated times of the detection switch 18. For example referring to FIG. 5C, when the detection switch 18 is operated for a first time (e.g., being pressed, touched, approached at a time point t1), an angle snap mode is entered and an angle is snapped at a first angle (e.g., preset as 2 degrees); when the detection switch 18 is operated for a second time (e.g., being pressed, touched, approached at a time point t2), an angle is snapped at a second angle (e.g., preset as 5 degrees); when the detection switch 18 is operated for a third time (e.g., being pressed, touched, approached at a time point t3), an angle is snapped at a third angle (e.g., preset as 10 degrees); and when the detection switch 18 is operated for a fourth time (e.g., being pressed, touched, approached at a time point t4), the angle snap mode is left, wherein it is assumed that the detection switch 18 is not operated during the time intervals t1-t2, t2-t3 and t3-t4. It is appreciated that the snap angles and operated times mentioned herein are only intended to illustrate, and different values of the snap angle and the number of operated times are arranged according to different requirements. It is further possible that a user defines values of the snap angle via a graphic interface.

In addition, when the detection switch 18 is arranged in the host system 30, it is also possible that the host system 30 changes, under the angle snap mode, the snap angle according to the number of operated times of the detection switch 18, e.g., referring to FIG. 5C.

In another non-limiting embodiment, when the detection switch 18 is a mouse roller 16, in addition to the normal rolling operation as in the conventional mouse device, the mouse roller 16 is further used to enter an angle snap mode while being pressed. In the angle snap mode, the control chip 13 further changes the snap angle according to the rotation of the mouse roller 16. For example, a forward rotation is arranged to gradually increase the snap angle; and a backward rotation is arranged to gradually decrease the snap angle, or vice versa. The increment and decrement of the snap angle is previously set and stored in the memory 14. When the mouse roller 16 is pressed again, the angle snap mode is left. It is also possible that when the mouse roller 16 is being continuously pressed, the snap angle is changeable according to the rotation of the mouse roller 16, and the angle changing function is ended when the mouse roller 16 is released from the pressing state.

In order to further improve the practicability of the human-machine interactive system of the present disclosure, in another embodiment the control chip 13 further calculates at least one of a velocity and acceleration (e.g., calculated by motion equations using software or firmware) according to the mouse displacement ΔDm, and adjusts the snap angle under the angle snap mode according to the calculated velocity or the calculated acceleration.

For example referring to FIG. 6, it shows an example of adjusting snap parameters according to the velocity and acceleration in the embodiment of the present disclosure. The human-machine interactive system of the present disclosure further includes a memory 14, e.g., nonvolatile memory, used to record a plurality of velocity thresholds and/or acceleration thresholds, e.g., three velocity thresholds and three acceleration thresholds being shown in FIG. 6, but not limited thereto.

In a non-limiting embodiment, when a current velocity V is smaller than a first velocity threshold (e.g., preset as 1 inch/second, ips), the control chip 13 does not perform an angle snap; when the current velocity V is larger than or equal to the first velocity threshold and smaller than a second velocity threshold (e.g., preset as 5 inch/second), the control chip 13 performs the angle snap at a first angle (e.g., preset as 2 degrees); when the current velocity V is larger than or equal to the second velocity threshold and smaller than a third velocity threshold (e.g., preset as 10 inch/second), the control chip 13 performs the angle snap at a second angle (e.g., preset as 5 degrees); and when the current velocity V is larger than or equal to the third velocity threshold, the control chip 13 performs the angle snap at a third angle (e.g., preset as 10 degrees), wherein the first velocity threshold, the second velocity threshold and the third velocity threshold increase sequentially but not limited to those values shown in FIG. 6; and the first angle, the second angle and the third angle increase sequentially but not limited to those values shown in FIG. 6.

In another non-limiting embodiment, when a current acceleration A is smaller than a first acceleration threshold (e.g., preset as a twice of gravity acceleration, 2G), the control chip 13 does not perform an angle snap; when the current acceleration A is larger than or equal to the first acceleration threshold and smaller than a second acceleration threshold (e.g., preset as five times of gravity acceleration, 5G), the control chip 13 performs the angle snap at a first angle (e.g., preset as 2 degrees); when the current acceleration A is larger than or equal to the second acceleration threshold and smaller than a third acceleration threshold (e.g., preset as ten times of gravity acceleration, 10G), the control chip 13 performs the angle snap at a second angle (e.g., preset as 5 degrees); and when the current acceleration A is larger than or equal to the third acceleration threshold, the control chip 13 performs the angle snap at a third angle (e.g., preset as 10 degrees), wherein the first acceleration threshold, the second acceleration threshold and the third acceleration threshold increase sequentially but not limited to those values shown in FIG. 6; and the first angle, the second angle and the third angle increase sequentially but not limited to those values shown in FIG. 6.

Similarly, when the detection switch 18 is arranged in the host system 30, it is also possible that the host system 30 changes the snap angle under the angle snap mode according to the velocity or acceleration of the mouse device 100 with respect to the work surface S, as shown in FIG. 6.

In other words, in the present disclosure, said normal mode refers to a mode in which an angle snapping function is never executed. Under the angle snap mode, the angle snapping function is not executed when the velocity and/or acceleration is too small, and the angle snapping function is executed when the velocity and/or acceleration exceeds a predetermined value. The changing of a snap angle with the velocity and/or acceleration is not necessary, and only a specific angle is snapped.

It should be mentioned that although the above embodiments take a desktop mouse as an example, the present disclosure is not limited thereto. In other embodiments, the detection switch 18 is applicable to other electronic devices for detecting movement, e.g., an optical finger mouse, wireless remote controller, game item and so on. As long as an electronic device is required to be able to output movement data in a straight line, the angle snapping function of the present disclosure can be adopted.

In addition, although in the above embodiments the detection switch 18 is directly arranged on the movement detection device (e.g., the mouse device 100), the present disclosure is not limited thereto. In other embodiments, the detection device 18 is disposed on a device, e.g., a bracelet, watch, joystick or the like, which is wired or wirelessly coupled to said movement detection device. When the detection switch 18 is operated by a user (e.g., being pressed, switched, rotated, touched or approached), the detection switch 18 outputs, in a wired or wireless manner, a control signal to the movement detection device to perform the angle snapping function thereby outputting or reporting smoothed movement data.

In addition, although the above embodiments are described with a single detection switch 18, the present disclosure is not limited thereto. In other embodiments, the human-machine interactive system includes more than one detection switch for entering/leaving an angle snap mode, selecting a snap angle, selecting velocity/acceleration thresholds, and so on.

As mentioned above, under some operating conditions, the user needs to real-timely operate the mouse device in a straight line to control the cursor movement in a straight line. Accordingly, the present disclosure provides a mouse device (e.g., FIGS. 2 to 3) and a human-machine interactive system (e.g. FIG. 1) that provide at least one detection switch to be operated by a user to switch between an angle snap mode and a non-snap mode. Accordingly, the user can perform a real-time switch when it is necessary or even select a required snap angle simply by a touch or press so as to improve the user experience.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A mouse device, comprising:
   a mouse case;
   a mouse roller;
   a detection switch arranged on the mouse case, and configured to output a detected signal while being operated; and
   a control chip, arranged inside the mouse case, configured to
   calculate and output displacement of the mouse device, and enter an angle snap mode according to the detected signal to perform an angle snap on the outputted displacement, and
   change a snap angle, under the angle snap mode, according to a rotation direction of the mouse roller, wherein increment and decrement of the snap angle corresponding to the rotation direction are previously set and stored in a memory.

2. The mouse device as claimed in claim 1, wherein the detection switch is a mechanical button, a mouse roller, a capacitive touch device, a position switch or a proximity sensor.

3. The mouse device as claimed in claim 1, wherein the control chip is configured to
   enter the angle snap mode when receiving the detected signal for a first time, and
   leave the angle snap mode when receiving the detected signal for a second time.

4. The mouse device as claimed in claim 1, wherein the detection switch is configured to output an enabling signal as the detected signal when detecting a start of operation and output a releasing signal as the detected signal when detecting an end of operation, and the control chip is configured to enter the angle snap mode when receiving the enabling signal, and leave the angle snap mode when receiving the releasing signal.

5. The mouse device as claimed in claim 1, further comprising:
   a light source arranged inside the mouse case and electrically coupled to the control chip, and configured to illuminate a work surface; and
   an image sensor arranged inside the mouse case and electrically coupled to the control chip, and configured to acquire reflected light from the work surface to generate an image frame to the control chip.

6. The mouse device as claimed in claim 1, the detection switch is arranged on an upper surface, a left surface or a right surface of the mouse case.

7. The mouse device as claimed in claim 1, wherein the mouse chip is further configured to change the snap angle, under the angle snap mode, according to a number of operated times of the detection switch.

8. A mouse device, comprising:
   a mouse case,
   a detection switch arranged on the mouse case, and configured to output a detected signal while being operated; and
   a control chip, arranged inside the mouse case, configured to calculate at least one of a velocity and an acceleration, enter an angle snap mode according to the detected signal, and adjust an increment or a decrement of a snap angle, under the angle snap mode, according to at least one of the calculated velocity and the calculated acceleration.

9. The mouse device as claimed in claim 8, wherein the detection switch is a mechanical button, a mouse roller, a capacitive touch device, a position switch or a proximity sensor.

10. The mouse device as claimed in claim 8, further comprising a memory configured to record a plurality of velocity thresholds, wherein under the angle snap mode,
    the control chip is configured to not perform an angle snap when the calculated velocity is smaller than a first velocity threshold,
    the control chip is configured to perform the angle snap at a first snap angle when the calculated velocity is larger than or equal to the first velocity threshold and smaller than a second velocity threshold, and
    the control chip is configured to perform the angle snap at a second snap angle when the calculated velocity is larger than or equal to the second velocity threshold and smaller than a third velocity threshold,
    wherein the first velocity threshold is smaller than the second velocity threshold, and the second snap angle is larger than the first snap angle.

11. The mouse device as claimed in claim 8, further comprising a memory configured to record a plurality of acceleration thresholds, wherein under the angle snap mode,
    the control chip is configured to not perform an angle snap when the calculated acceleration is smaller than a first acceleration threshold,
    the control chip is configured to perform the angle snap at a first snap angle when the calculated acceleration is larger than or equal to the first acceleration threshold and smaller than a second acceleration threshold, and
    the control chip is configured to perform the angle snap at a second snap angle when the calculated acceleration is larger than or equal to the second acceleration threshold and smaller than a third acceleration threshold,
    wherein the first acceleration threshold is smaller than the second acceleration threshold, and the second snap angle is larger than the first snap angle.

12. The mouse device as claimed in claim 8, wherein the control chip is configured to enter the angle snap mode when receiving the detected signal for a first time, and leave the angle snap mode when receiving the detected signal for a second time.

13. The mouse device as claimed in claim 8, wherein the detection switch is configured to output an enabling signal as the detected signal when detecting a start of operation and output a releasing signal as the detected signal when detecting an end of operation, and the control chip is configured to enter the angle snap mode when receiving the enabling signal, and leave the angle snap mode when receiving the releasing signal.

14. An interactive system, comprising:

a mouse device, configured to detect mouse displacement with respect to a work surface;

a display screen, configured to show a cursor;

a host system, coupled to the mouse device and the display screen, and configured to control a cursor displacement of the cursor shown on the display screen according to the mouse displacement; and a detection switch, arranged on the mouse device or the host system, and configured to output a detected signal while being operated, wherein the host system is configured to enter an angle snap mode when receiving the detected signal to perform an angle snap on the cursor displacement, and increase or decrease a snap angle of the cursor displacement according to a comparison between a velocity or an acceleration of the mouse device with a predetermined threshold.

15. The interactive system as claimed in claim 14, wherein the host system comprises a keyboard, and the detection switch is arranged on the keyboard.

16. The interactive system as claimed in claim 14, wherein the mouse device has a mouse case, and the detection switch is arranged on a surface of the mouse case.

17. The interactive system as claimed in claim 14, wherein when the detection switch is a mechanical button, a mouse roller, a capacitive touch device or a proximity sensor.

18. The interactive system as claimed in claim 14, wherein, under the angle snap mode, the host system is further configured to change the snap angle of the cursor displacement according to a number of operated times of the detection switch.

* * * * *